Sept. 19, 1944.    W. H. DE LANCEY    2,358,629
LIQUID DISPENSING APPARATUS
Filed April 9, 1943    6 Sheets-Sheet 2

INVENTOR,
Warren H. DeLancey,
BY
Chapin & Neal
ATTORNEYS.

Sept. 19, 1944.   W. H. DE LANCEY   2,358,629
LIQUID DISPENSING APPARATUS
Filed April 9, 1943   6 Sheets-Sheet 3

INVENTOR,
Warren H. DeLancey,
BY
Chapin & Neal
ATTORNEYS.

Sept. 19, 1944.    W. H. DE LANCEY    2,358,629
LIQUID DISPENSING APPARATUS
Filed April 9, 1943    6 Sheets-Sheet 4

INVENTOR,
Warren H. DeLancey,
BY Chapin + Neal
ATTORNEYS,

Sept. 19, 1944. W. H. DE LANCEY 2,358,629
LIQUID DISPENSING APPARATUS
Filed April 9, 1943 6 Sheets-Sheet 6

INVENTOR,
Warren H. DeLancey,
BY
Chapin & Neal
ATTORNEYS.

Patented Sept. 19, 1944

2,358,629

UNITED STATES PATENT OFFICE 2,358,629

LIQUID DISPENSING APPARATUS

Warren H. De Lancey, Springfield, Mass., assignor to Gilbert & Barker Manufacturing Company, West Springfield, Mass., a corporation of Massachusetts Application April 9, 1943, Serial No. 482,373

17 Claims. (Cl. 73—200)

This invention relates to an improved apparatus for dispensing measured quantities of liquid, such as gasoline or other motor fuels, for example. More particularly, the invention has to do with an apparatus of this kind in which the dispensing pump is prevented from operating except on liquid and on liquid which is free of air or other gas.

The invention has a most important use in dispensing apparatus of the type wherein a single element—a so-called meter-pump—is used for the combined work of pumping and measuring the liquid dispensed. One example of a dispensing apparatus, having a meter-pump will be found in my prior U. S. Patent No. 2,300,145, dated October 27, 1942. In apparatus of this sort, it is imperative that the meter-pump be fully primed before it can be started. In addition, there must be means which are effective during operation of the meter-pump to rid the liquid of air or other gas before it reaches the pump in order to avoid the inaccuracies in measurement which would otherwise result.

This invention has for its general object the provision of a better apparatus for performing the general work above described.

A particular object of the invention is to locate the hydraulic clutch which is interposed in the driving connections to the meter-pump and its connected registering means, outside the chamber in which air and gases are separated from the liquid, to avoid churning of the liquid by the rotating clutch elements and maintain the liquid more nearly in the quiescent state that is desirable for efficient air separation.

A further object of the invention is to arrange the hydraulic clutch so that it is not at any time immersed in any liquid, the fluids being drawn from the separating chamber and conducted into the interior of the clutch and allowed to flow outwardly therefrom, the arrangement being characterized by an avoidance of air locks within the clutch and the use of less power than would be the case if the clutch was immersed in liquid.

The invention has for a further object to provide a scavenging pump which operates to skim the top of the separator, drawing the fluids (air or mixed air and liquid, or liquid, as the case may be), and forcing them under positive pressure into the interior of the hydraulic clutch, thereby providing an arrangement that can be made very sensitive, responding to the presence of even a small amount of air in the liquid and stopping the pump even on a very small leak if desired.

The invention has for a further object to provide as a scavenging pump in the arrangement just described, a positively-acting pump of variable capacity for forcing fluids into the interior of the clutch and to provide means for varying such capacity in accordance with the need, increasing the capacity when air is drawn from the separator and decreasing it when liquid is drawn from the separator.

These and other objects will best be understood as the detailed description proceeds and they will be pointed out in the appended claims.

The invention will be disclosed with reference to the accompanying drawings, in which—

Figure 1:
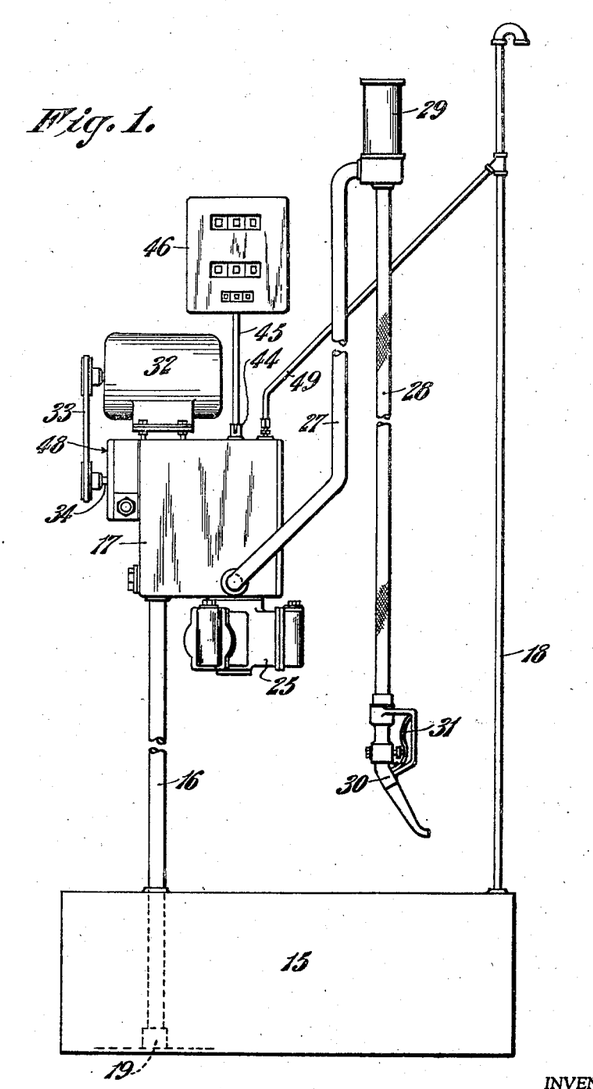
Fig. 1 is a small scale diagrammatical view of a liquid measuring and dispensing apparatus embodying the invention.
Figures 6, 7:
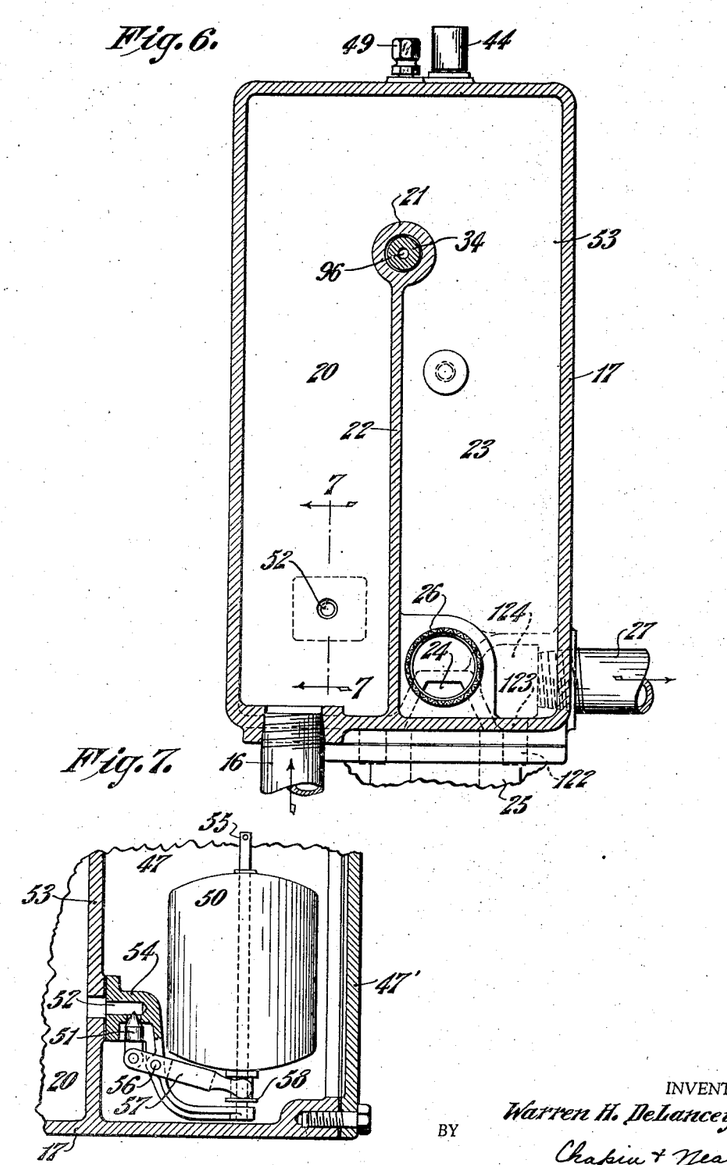
Fig. 7 is a fragmentary sectional elevational view taken on the line 7—7 of Fig. 6.

Referring to these drawings and first to Fig. 1, liquid, such as gasoline, is drawn up from a low level storage tank 15 through a suction pipe 16 into a casing 17. The tank has the usual vent pipe 18 and pipe 16 has the usual foot valve 19. As best shown in Fig. 6, the liquid flowing into casing 17 passes upwardly through a chamber 20 and over the rounded top 21 of the dam-like partition 22 into a chamber 23. In this chamber liquid is trapped for maintaining the metering pump primed and here also the liquid is freed from air or gases before passing to the single outlet 24 which is provided in the base of chamber 23 and which leads to the intake of the metering pump 25. The outlet 24 is protected by a fine screen 26 which assists in the work of air separation by preventing the passage of air bubbles therethrough. The chamber 20 forms an extension of pipe 16 and this chamber and pipe constitute a suction conduit connecting the storage tank to the separator 23.

The pump 25 (Fig. 1) discharges the liquid through a delivery conduit herein shown as including the fixed piping 27 and a flexible hose 28 with an optionally interposed visible discharge indicator 29 of any suitable type. The hose terminates with a valved nozzle 30 of the usual or any suitable form. The valve of this nozzle tends to close automatically but may be opened manually by hand lever 31. The metering pump 25 is driven by an electric motor 32 through a belt connection 33 to one end of a horizontal drive shaft 34. The latter (see Fig. 2) is rotatably supported in bearings provided in the rounded top 21 of the dam. On the other end of this shaft is fixed one element 35 of a hydraulic clutch. The other element 36 of this clutch carries a pinion 37, meshing with a gear 38, which carries a bevel gear 39, driving a bevel gear 40, fixed on a vertical shaft 41, suitably mounted as shown in the casing 17. The lower end of this shaft 41 is connected by a coupling 42 to the upper end of the drive shaft 43 of the meter pump. The upper end of shaft 41 is connected by a coupling 44 to the drive shaft 45 of a registering mechanism 46 (Fig. 1) of any suitable kind for indicating the quantity and/or cost of the liquid dispensed.

The hydraulic clutch 35—36 (Fig. 2) is located in the upper part of a third chamber 47 formed in casing 17. Fluid from the separator is drawn off from the top of chamber 23 by means of a scavenging pump 48 and forced into the interior of the clutch, the fluids leaving the clutch being received in the chamber 47. These fluids, which may be air, or other gas, liquid, or a mixture of liquid and gas, separate by gravitational action in chamber 47 and are separately discharged therefrom. The air passes out through a vent pipe 49 connected to the top of chamber 47, and is discharged to the atmosphere. Herein, the pipe 49 is shown diagrammatically in Fig. 1 as connected to vent pipe 13 but, obviously, this interconnection of vent pipes is not at all necessary. As will be clear from Fig. 2, the liquid, which accumulates in the lower part of chamber 47, will eventually raise a float 50. The latter opens a valve 51 which, as best shown in Fig. 7, allows the liquid to be drawn into the chamber 20 through a passage 52. This passage is formed in part in the partition wall 53 between the chamber 47 and the chambers 20 and 23 and in part in a bracket 54 secured to such partition. The bracket 54 has fixed thereto an upstanding rod 55 on which the float is slidably mounted. The bracket also pivotally supports at 56 a lever 57, one end of which is connected to valve 51 and the other and forked end of which is engaged in the annular groove of a collar 58 fixed to the bottom of the float. This float is intended to prevent liquid from rising in chamber 47 above the level indicated by the dot-dash line 59 shown in Fig. 2. More particularly, the float is intended to keep the liquid well below the hydraulic clutch so that the latter cannot under any normal condition become immersed in the liquid.

The chamber 47 has a removable wall 47' in order to allow easy access to the chamber for assembly of the various parts above described as located therein.

The scavenging pump 48 is of the positively-acting type, capable of drawing air and gases from the suction pipe 16 to prime the metering pump. The scavenging pump is preferably also of variable capacity. In the illustrative example herein shown, the scavenging pump consists of a rotor 60 (Figs. 2 and 4) keyed in coaxial relation on the horizontal drive shaft 34 and carrying a circular series of radially-slidable blades 61. The stator of the pump consists of an annular ring 62 suspended by links 63 from a surrounding housing 64. The stator ring 62 is free to slide between a finished wall 65 of the casing 17 and a cover plate 66 which closes the opening in member 64 and which is secured by cap screws 67 to casing 17. The blades 61, which are equal in length to the width of the stator ring 62, also slide freely between cover 66 and surface 65. These blades are held outwardly in contact with the inner peripheral wall of ring 62 by two annular rings 68, arranged one at each end of the rotor in recesses formed one in each end face thereof. The stator ring 62 may be moved back and forth to vary its eccentricity with relation to the rotor shaft by a lever extension 69 (Fig. 4) of one of the suspension links 63. The lower end of lever 69 is forked to engage in the circumferential groove 70 formed in a piston rod 71, having a piston 72 fixed thereto. The piston is slidable in a cylinder 73 formed in housing 64. A cap 74 closes one end of cylinder 73 and has threaded therein a screw 75, the inner end of which forms an adjustable stop for holding the piston, and thus the stator, in the extreme right-hand position illustrated. A lock nut 76 is provided to hold stop screw 75 in its various positions of adjustment and a cap 77 covers the head of screw 75 and nut 76 to conceal them and also to prevent leakage from the cylinder around the screw. The piston rod 71 is slidably supported at its other end in a bore 78 in housing 64 and a spring 79, coiled around rod 71 and acting between the collar 70 and housing 64, yieldingly holds the piston against stop 75 and in the illustrated position. Liquid under pressure, introduced into the right-hand end of cylinder 73 by means to be described, can move the piston to the left against the force of spring 79 and thereby diminish the capacity of the scavenging pump by decreasing the eccentricity of the stator 62 with respect to its rotor. The movement of the piston to the left is limited by the abutment of one end of the piston rod with the bottom of the bore 78.

Figures 2, 3:
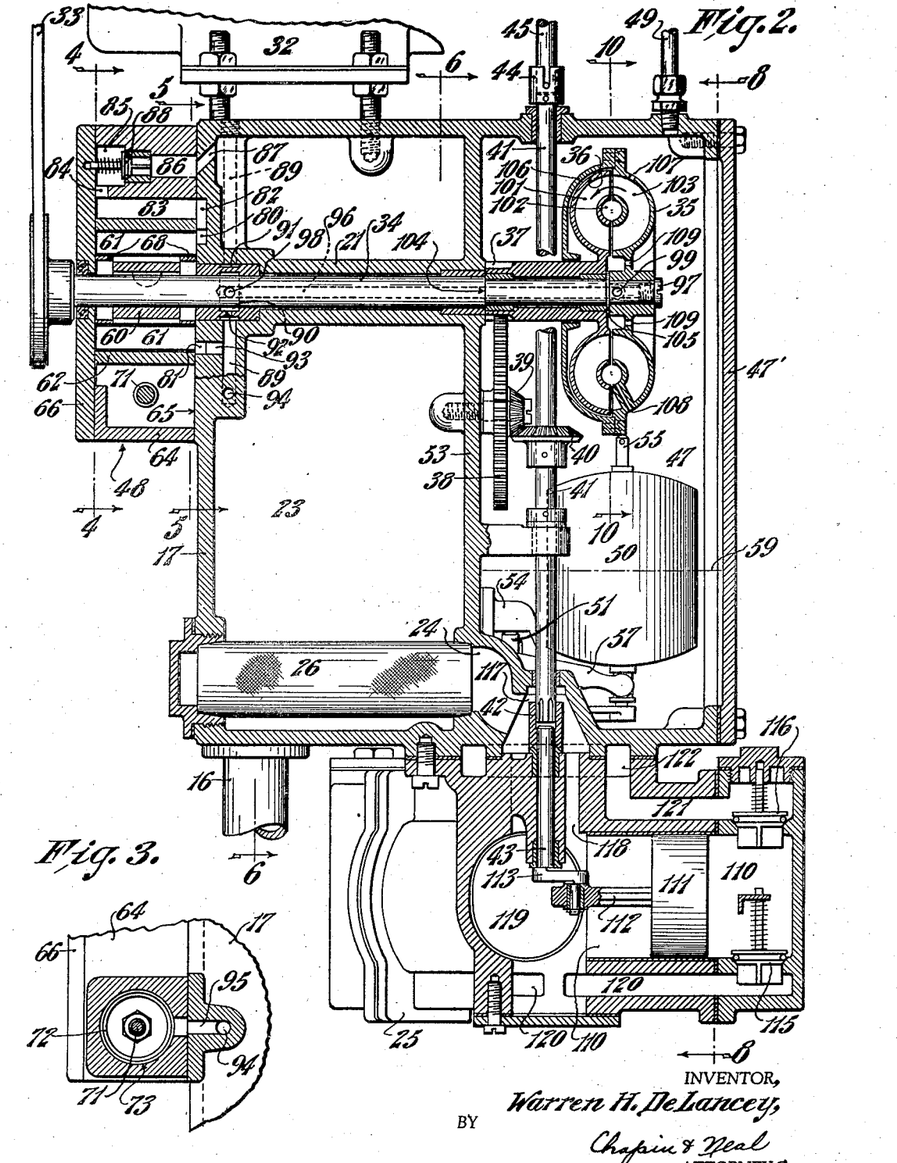
Fig. 2 is a sectional elevational view, drawn to a larger scale, of one unit of the apparatus shown in Fig. 1, such unit including the meter-pump, separator, hydraulic clutch, and scavenging pump.
Fig. 3 is a fragmentary cross-sectional view taken on the line 3—3 of Fig. 4.
Figure 4:
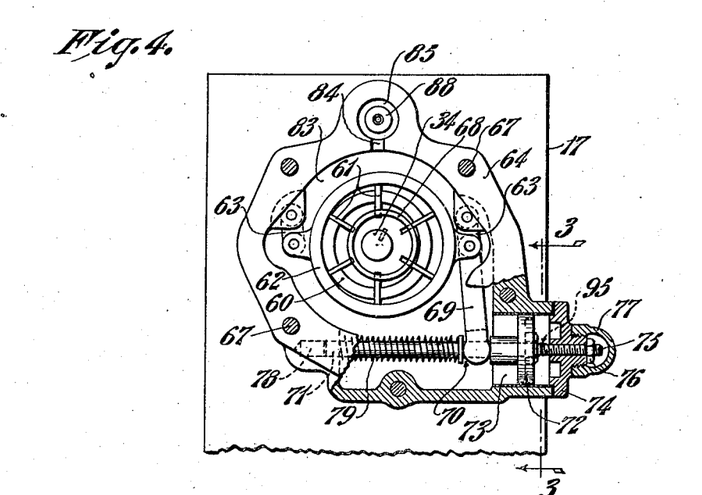
Figs. 4, 5, and 6 are cross-sectional views taken on the lines 4—4, 5—5, and 6—6, respectively, of Fig. 2.
Figure 5:
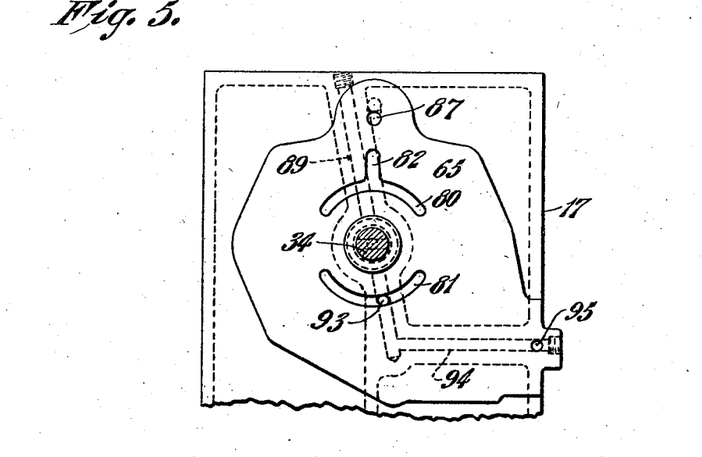

The scavenging pump (Fig. 5) has inlet and outlet ports which consist of arcuate grooves 80 and 81, respectively, formed in the aforesaid finished wall 65 of the casing 17. A vertical groove 82 in said face connects inlet port 80 to the space 83 between the housing 64 and stator ring 62 (Fig. 2), and a passage 84 connects such space to a valve chamber 85. A passage 86 leads from such valve chamber and is connected through a hole 87 of small diameter formed in a wall of casing 17 to the top of the separator chamber at a location directly above the top 21 of dam 22. A spring-pressed inlet valve 88 controls communication between the passage 86 and chamber 85. The wall of casing 17, immediately in back of the scavenging pump is thickened as shown in Fig. 2 to provide for a hole 89 which is drilled from the top of casing 17, to the left of hole 87 as viewed in Fig. 5, in a direction diametrically of the shaft 34 to and below the same. The adjacent bearing for shaft 34 (Fig. 2) has inner and outer circumferential grooves 90 and 91 therein and an interconnecting radial hole 92 of small diameter. The outer end of hole 89 is permanently plugged up and only the part of the hole below the shaft bearing is actively used. A hole 93 connects the outlet port 81 with hole 89 at a point below shaft 34. A horizontal hole 94 (Fig. 5) connects the lower end of hole 89 to a passage 95. This passage, as shown in Fig. 3, opens into cylinder 73 and at a point to the right of piston 72, as shown in Fig. 4. The outlet of the scavenging pump is thus connected to cylinder 73 to operate the piston 72 and thereby shift the stator 62 to vary the capacity of the pump.

Figures 9, 11:
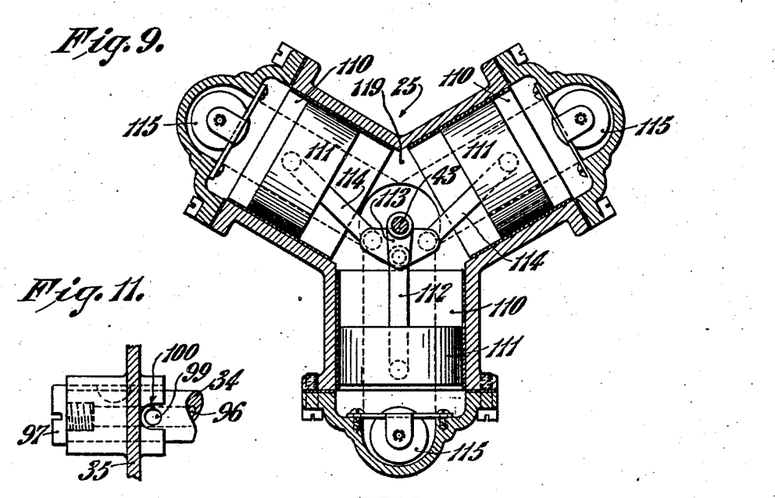
Fig. 9 is a sectional plan view taken on the line 9—9 of Fig. 8.
Fig. 11 is a fragmentary sectional view taken on the line 11—11 of Fig. 10.
Figure 10:
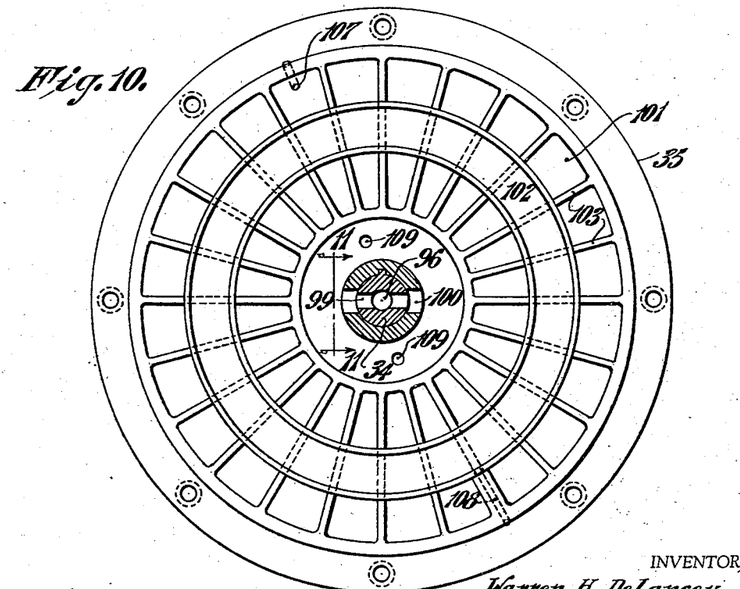
Fig. 10 is a cross-sectional view taken on the line 10—10 of Fig. 2 and drawn to a larger scale.

The outlet of this pump is also connected to the interior of the hydraulic clutch. A hole 96, Fig. 2, extends axially inward through the shaft 34 from the clutch end thereof to about the center of the left-hand bearing of the shaft. The outer end of hole 96 is closed by a screw 97. The inner end of hole 96 is connected by a diametrical hole 98 in shaft 34 with the inner circumferential groove 90. A diametrical hole 99, Figs. 2 and 10, in shaft 34 near its right-hand end connects hole 96 to the inlet chamber of the hydraulic clutch. The hub of clutch member 35, which is keyed to shaft 34, has in its inner end U-shaped recesses 100 (Fig. 11) which enable liquid to leave holes 99 and enter the central chamber of member 35.

The centrifugal clutch, in the illustrative example herein shown in Fig. 2, is of the vortex ring type. The driving and pump member 35 and the driven and turbine member 36 together from a torus-shaped pipe 101 having within it a similar smaller pipe 102. The two pipes are connected by a circular series of radial vanes 103 (see Fig. 10). These two pipes are split in half along their circular axis. The driven half 36 (Fig. 2) has a hub mounted to turn freely on shaft 34 and held in axial position between a shoulder 104 on the shaft and a washer 105 which in turn is held against a second shoulder on the shaft by means of the hub of the driving half 35. A casing 106, fixed as indicated, to the marginal flange of member 35 encompasses the driven member 36 and encloses it, the hub of this casing 106 being freely rotatable on the hub of member 36. The only outlets for the clutch are those provided in driving member 35. There is a small hole 107, located near the outer peripheral part of the member and forming an outlet for torus pipe 101. There is a similar outlet 108 for the inner pipe 102, the hole 108 being formed in one of the radial vanes 103 which is thickened to provide for it (see Fig. 10). In addition, there are one or more holes 109 in the inner circular web of member 35. When air or gas is pumped into the clutch it is readily vented through the holes 107 and 108 into chamber 47 and member 36 remains stationary. The combined area of holes 107 and 108 is large enough to freely pass all the air that the scavenging pump can pump when working at maximum capacity. When, however, liquid enters, it is slung outwardly by centrifugal force into the torus pipes 101 and 102, and the only outlets available are the holes 107 and 108. The combined areas of these two holes is too small to pass all the liquid that the scavenging pump can pump when working at minimum capacity. Therefore, liquid soon fills the pipes and the member 36 is driven. When the pipes become filled with liquid, the excess will then leave by way of the holes 109 in one wall of the inlet chamber of the clutch. These holes 109 are parallel to the axis of rotation of the clutch and out of the path of the liquid which is thrown outwardly by centrifugal force. Thus, liquid does not enter holes 109 until the clutch is filled. Liquid might also leave by way of the space between the hubs of members 36 and 106 but for the fact that this space is located nearer the axis of rotation of the clutch than the holes 109. The liquid reaches these holes first on filling of the clutch and these holes provide an adequate vent for all excess liquid pumped.

Figure 8:
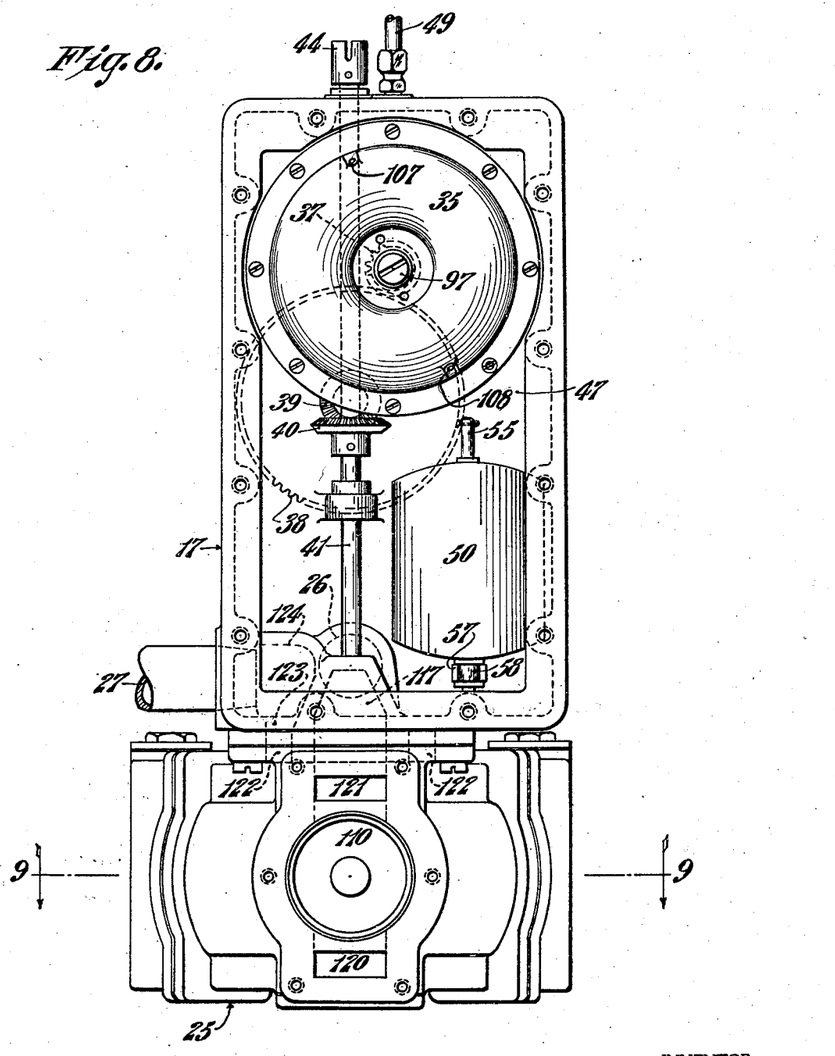
Fig. 8 is a cross-sectional view taken on the line 8—8 of Fig. 2.

The metering pump may be of any suitable positively-acting displacement type. In the form herein shown in Fig. 9, it consists of three radially-disposed cylinders 110, each having a single-acting piston 111 therein. One piston is direct-connected by a master connecting rod 112 to a crank 113 on the meter drive shaft 43, above described. The other piston rods 114 are connected to the master connecting rod 112. Each cylinder has spring-pressed inlet and outlet valves 115 and 116, respectively (Fig. 2). The inlet port 24, heretofore described, connects with a part-conical chamber 117 surrounding shaft 41. From this chamber, vertical passages 118 lead downwardly into the central crankcase 119. From the crankcase passages 120 radiate, one below each cylinder, and connect one with the outer end of each cylinder when its inlet valve 115 is open. Each outlet valve 116 opens into a radial passage 121 extending inwardly above its cylinder and thence upwardly into an annular chamber 122. This chamber, as indicated in Fig. 8, is connected by a passage 123 to a chamber 124 which is formed in casing 17 and to which the delivery pipe 27 is connected.

The operation of the apparatus will next be described. To initially prime the entire dispensing and measuring apparatus, one simply starts the motor 32 by the usual or any suitable means. This immediately starts the scavenging pump 48, which then pumps at its maximum rate because of the lack of liquid under pressure in the control cylinder 73. The metering pump 25 will not start because no torque can be developed in the hydraulic clutch by air. The scavenging pump, working for example at the rate of 20 gallons per minute, quickly exhausts the suction pipe 16 and chamber 20, whereby liquid rises to fill the pipe and chamber to the level of the rounded top 21 of dam 22. Continued operation of the scavenging pump will cause liquid to overflow the dam and fall into and eventually fill chamber 23. Meanwhile, the displaced air is pumped out through the hydraulic clutch which, as described, freely vents all the air that the pump 48 can pump, the air passing out of chamber 47 through vent pipe 49. When the chambers 20 and 23 and the space above them in casing 17 are substantially completely filled, then and then only does liquid begin to be pumped. At first a mixture of liquid and air will pass to the clutch and the air will be freely vented and probably some liquid also. As soon as liquid is pumped to the clutch in sufficient volume, the clutch element 36 and thus the meter-pump 25 will be driven, provided the valve of nozzle 30 is opened. If the nozzle valve is not opened, the clutch will slip. The pump 48 will also slow down to its minimum rate, because it is pumping liquid only. The pump 25 will suck out all air out of its inlet passages, such as 117, 118, 119, and 120, and expel such air and the air in the outlet passages and in the dispensing line. As soon as all air is driven out of the dispensing line and a clear flow of liquid issues from the nozzle 30, the latter is closed.

The meter-pump will then stop because the hydraulic clutch will slip and the motor 32 may be stopped. The registering means will be reset to zero in the usual manner.

In the normal condition of the apparatus, the metering pump will be fully primed and chamber 23 will be filled with the liquid trapped therein. In case that the foot valve 19 leaks, liquid will drain back from the chamber 20 and pipe 16, but the chamber 23 remains filled to the level of the top of dam 22. Vaporization of highly volatile motor fuels in the suction line may also make necessary a priming operation before dispensing of measured quantities of liquid can occur. But the priming, whenever required, is rapidly accomplished because the scavenging pump has a large capacity for priming. So, the suction pipe 16 and chamber 20 will be quickly exhausted of air and vapor as before, until the separator is substantially completely filled with liquid. Then the metering pump will start, on opening of the hose nozzle 30, and measured quantities of liquid will be dispensed. Meanwhile, the scavenging pump continues to operate, but at a lower rate, say two and a half gallons per minute, because its work now is simply to skim the top of the separator and remove any air or air-laden liquid that may be present there. The restriction 92 and the strength of spring 79 determine when the scavenging pump will shift to minimum capacity. The hole 92 will freely pass all the air that the scavenging pump can pump but it is not large enough to pass all the liquid that can be pumped. Hence, a pressure rise occurs in cylinder 73 and the stator of the scavenging pump is shifted to lower its pumping rate. As at present arranged, a pressure of 10 pounds will cause the scavenging pump to shift to its minimum rate.

The normal work of air separation, which may take place continuously during dispensing whenever required, is accomplished under very favorable conditions. The hydraulic clutch is located outside the separator. Hence, the liquid in the separator may be maintained much more nearly in the quiescent state that is so desirable for effective separation. Churning of the liquid by rotating elements of the hydraulic clutch impedes air separation. The separator, of course, has the large volume necessary to slow down the velocity of the liquid which is another essential for good separation. And again, the separator is located on the suction side of both pumps. Therefore, no super-atmospheric pressure can be developed in the separator and instead a sub-atmospheric pressure exists which promotes effective release of air or gases entrapped in the liquid. Any gasoline vapor drawn out of the separator is condensed in the outlet passages of the scavenging pump because of the pressure existing in such passages and the condensed gasoline is recovered in chamber 47 and drawn back into the separator. The screen 26 also aids materially by preventing the passage of air into the metering pump and forcing such air to rise to the top of the separator. The final separation occurs in chamber 47. The scavenging pump continually skims off the top of the separator, taking any frothy liquid containing air and forcing it into chamber 47, wherein the air and liquid separate by gravity under atmospheric pressure. Here again the liquid is in the desirable quiescent condition because the hydraulic clutch is not immersed, and cannot be under any normal condition of operation, in the liquid.

It will be noted that the apparatus is very sensitive and can be made to respond to even a very small leak in the suction line. The outlet 87 is located close to the top of the separator and there is very little space left above this outlet for air to accumulate. As soon as air is drawn into the outlet 87 the driving torque between the elements of the hydraulic clutch will decrease and, if much air is drawn in, the torque will quickly decrease to zero. Hence, the apparatus can be arranged to stop the dispensing pump, when only a small leak exists. This feature, while of prime importance when the dispensing pump is a metering pump as shown, may also be useful in other cases, even though the dispensing pump is not relied on to meter the liquid. Of course, the location of the outlet 87 may be varied to change the sensitivity of the apparatus, if desired. If the outlet is placed at a lower level in the separator, there is room for more air to accumulate and hence the apparatus will operate longer than it otherwise would for a leak of given size. Hence, the sensitivity of the apparatus is decreased. As shown, the separator must be substantially completely filled with liquid in order to maintain the metering pump 25 in operation.

The apparatus operates effectively and reliably due to the positive feeding of the fluids into the hydraulic clutch and in a systematic manner. The fluids are not merely admitted to the clutch by gravity flow. They are forced into the clutch by a positively-acting pump under some pressure. And the fluids are introduced into the central or inlet chamber of the driving clutch member 35 from which chamber the fluids will be thrown out by centrifugal force through the space between the confronting faces of the clutch members toward and to the peripheral part of the torus pipe members. The flow is in a systematic planned manner and flow occurs in natural paths. Air locks in the clutch are thereby avoided. Air and gases are readily vented from the clutch. Initially, both peripheral outlets 107 and 108 function for this purpose. As the torus pipes fill with liquid, there is a tendency for any air to accumulate in the inner torus pipe 102. That is, the liquid itself is circulating around in a circular path from one-half of a torus pipe to the other half, and the lighter portions naturally remain in the center or in the inner torus pipe. This inner torus pipe has its own vent 108 which is effective to bleed air, even after the outer pipe has been completely filled. When the inner torus pipe is also filled with liquid, there are still available for air-venting the two outlets 109 from the inlet chamber of the clutch, and these still remain operative to vent air up to the time when the inner chamber becomes completely filled and there is no longer any need for air venting. It will be clear that there is virtually no chance for air to get trapped in the clutch.

It will also be noted that since the clutch runs in air, substantially less power is consumed. There is no drag of the liquid on the clutch members and the latter are not moving liquid in any manner other than in the planned and systematic manner inside the torus pipes as above described. This type of clutch is highly efficient, as is well known, and results in only a very small loss of power.

The invention thus provides in a dispensing and measuring apparatus for liquids such as gasoline or other motor fuels, an improved and reliable arrangement for preventing the dispensing pump from operating except on liquid which is free of air or other gas. The invention is very useful in the particular case where the dispensing pump also functions as a meter and an effective means has been provided to prevent air or other gas from entering the meter. A quick priming arrangement is provided whenever scavenging of the suction pipe is necessary and this quick-priming pump is automatically lowered in capacity, on completion of priming, to function during normal dispensing operations to skim the separator of air or other fluids that may be present and insure that only air-free liquid can pass to the metering pump. And the invention provides the protection against operation of the metering pump on air by means of a hydraulic clutch which is made to respond to the presence or absence of air in the separator without having the clutch interfere with effectiveness of the air separation. The invention also provides a means by which the dispensing pump, whether a meter-pump or otherwise, may be arranged to stop in the event of an air leak and this means may be made very sensitive, if desired, so that the pump will be stopped in the event of even a small leak in the suction line.

What I claim is:

1. Liquid dispensing apparatus particularly adapted for the sale of motor fuel such as gasoline, comprising, a positively-acting displacement meter, a supply conduit and a delivery conduit therefor, means for driving said meter, whereby the meter functions also as a pump, a registering mechanism for said meter connected to said driving means for synchronous operation with the meter, a priming and scavenging means connected to the supply conduit at a location slightly above said meter pump to scavenge air and gases from the supply conduit and for priming the same by suction, a discharge conduit for the scavenging means, said driving means including a hydraulic clutch for controlling the operation of said meter and registering mechanism, said clutch receiving the discharge from the discharge conduit and respectively operable in response to the delivery of liquid or gas from the discharge conduit to drive or not to drive said meter pump and connected registering mechanism.

2. In apparatus for measuring and dispensing liquid, a storage tank for the liquid, a gas and liquid separator, a suction conduit connecting said tank and separator and opening into the separator at a level substantially above the bottom thereof, a metering pump of the positively-acting displacement type connected to the separator near the bottom thereof to draw air-free liquid only therefrom, registering means connected to said pump to be driven when the pump is driven, a single pump for the combined purposes of priming said metering pump by filling said separator with liquid and for scavenging the air and gases therefrom, said last-named pump connected to the separator above said level, a motor, and hydraulic means receiving the discharge from the last-named pump and respectively responsive to the delivery of liquid and to the delivery of air thereto for coupling and uncoupling the motor to said metering pump and connected registering means.

3. A liquid dispensing apparatus particularly adapted for the sale of motor fuel such as gasoline, comprising, a suction conduit adapted for connection at one end to a source of supply, a chamber for trapping liquid and to which the other end of said conduit is connected at a level substantially spaced above its bottom, a positively-acting displacement meter having its intake connected to said chamber near the bottom thereof, a dispensing conduit connected to the outlet of the meter, means for driving said meter whereby the meter functions also as a pump, a registering mechanism connected to said driving means for synchronous operation with the meter, a priming and scavenging pump having its inlet connected to the upper part of said chamber, said driving means including a hydraulic clutch, a conduit connecting the outlet of the last-named pump to the interior of said clutch to cause it to respectively couple or uncouple the driving means to the meter pump and registering mechanism accordingly as liquid or air is received therefrom, said clutch having an outlet for the delivery of fluids received from the second-named pump, and means receiving the fluids discharged from the clutch and for separating the air and liquid and separately discharging the same.

4. In apparatus for measuring and dispensing liquid, a storage tank for the liquid, a gas and liquid separator, a suction conduit connecting said tank and separator and opening into the separator at a level substantially above the bottom thereof, a metering pump of the positively-acting displacement type connected to the separator near the bottom thereof to draw air-free liquid only therefrom, registering means connected to said pump to be driven when the pump is driven, a single pump for the combined purposes of priming said metering pump by filling said separator with liquid and for scavenging the air and gases therefrom, said last-named pump connected to the separator above said level, a motor, and a hydraulic clutch located outside said chamber and receiving the discharge from the last-named pump, said clutch being respectively responsive to the delivery of liquid and to the delivery of air thereto for coupling and uncoupling the motor to said metering pump and connected registering means.

5. A liquid dispensing apparatus particularly adapted for the sale of motor fuel such as gasoline, comprising, a suction conduit adapted for connection at one end to a source of supply, a chamber for trapping liquid and to which the other end of said conduit is connected at a level substantially spaced above its bottom, a positively-acting displacement meter having its intake connected to said chamber near the bottom thereof, a dispensing conduit connected to the outlet of the meter, means for driving said meter whereby the meter functions also as a pump, a registering mechanism connected to said driving means for synchronous operation with the meter, a priming and scavenging pump having its inlet connected to the upper part of said chamber, said driving means including a hydraulic clutch located outside said chamber and unimmersed in liquid, and a conduit connecting the outlet of the last-named pump to the interior of said clutch to cause it to respectively couple or uncouple the driving means to the meter pump and registering mechanism accordingly as liquid or air is received therefrom.

6. A liquid dispensing apparatus particularly adapted for the sale of motor fuel such as gasoline, comprising, a suction conduit adapted for connection at one end to a source of supply, a chamber for trapping liquid and to which the other end of said conduit is connected at a level substantially spaced above its bottom, a positively-acting displacement meter having its intake connected to said chamber near the bottom thereof, a dispensing conduit connected to the outlet of the meter, means for driving said meter whereby the meter functions also as a pump, a registering mechanism connected to said driving means for synchronous operation with the meter, a priming and scavenging pump having its inlet connected to the upper part of said chamber, said driving means including a hydraulic clutch of the vortex ring type having an inlet near its center and a peripheral vent, a conduit connecting the outlet of the last-named pump to the inlet of said clutch to cause it to respectively couple or uncouple the driving means to the meter pump and registering mechanism accordingly as liquid or air is received therefrom.

7. A liquid dispensing apparatus particularly adapted for the sale of motor fuel such as gasoline, comprising, a suction conduit adapted for connection at one end to a source of supply, a chamber for trapping liquid and to which the other end of said conduit is connected at a level substantially spaced above its bottom, a positively-acting displacement meter having its intake connected to said chamber near the bottom thereof, a dispensing conduit connected to the outlet of the meter, means for driving said meter whereby the meter functions also as a pump, a registering mechanism connected to said driving means for synchronous operation with the meter, a priming and scavenging pump having its inlet connected to the upper part of said chamber, said driving means including a hydraulic clutch, a conduit connecting the outlet of the last-named pump to the interior of said clutch to cause it to respectively couple or uncouple the driving means to the meter-pump and registering mechanism accordingly as liquid or air is received therefrom, said clutch having an outlet for the delivery of fluids received from the second-named pump, a second chamber receiving the fluids discharged from the clutch and in which said clutch is located, a vent for such chamber for discharging the air, and means operable when the liquid in the second chamber rises above a predetermined level for discharging the liquid therefrom and preventing the liquid from rising enough to reach said clutch.

8. In apparatus for measuring and dispensing liquid, a storage tank for the liquid, a gas and liquid separator, a suction conduit connecting said tank and separator and opening into the separator at a level substantially above the bottom thereof, a metering pump of the positively-acting displacement type connected to the separator near the bottom thereof to draw air-free liquid only therefrom, registering means connected to said pump to be driven when the pump is driven, means including a hydraulic clutch for driving said pump and registering means, said clutch being located outside said separator and unimmersed in liquid, said separator having near the top thereof a relatively-small constantly-open outlet, a scavenging pump skimming off the top of the liquid in the separator by drawing fluids from said outlet and forcing them into the interior of said clutch, whereby the clutch responding to the presence of air or liquid respectively causes the metering pump and registering means to be stopped or driven.

9. In apparatus for measuring and dispensing liquid, a storage tank for the liquid, a gas and liquid separator, a suction conduit connecting said tank and separator and opening into the separator at a level substantially above the bottom thereof, a metering pump of the positively-acting displacement type connected to the separator near the bottom thereof to draw air-free liquid only therefrom, registering means connected to said pump to be driven when the pump is driven, means including a hydraulic clutch for driving said metering-pump and registering means, a variable-capacity scavenging pump having its suction side connected to the separator near the top thereof, an outlet conduit for the scavenging pump connected to the interior of said clutch, a restriction in said outlet conduit of a size large enough to pass all the air that the scavenging pump can pump when working at maximum capacity but not large enough to pass all the liquid, whereby when liquid is pumped through said outlet conduit a rise in pressure ensues, and means operable by such rise in pressure to reduce the capacity of the scavenging pump.

10. Liquid dispensing apparatus, comprising, a dispensing conduit adapted to be connected to a source of liquid supply, means for forcing liquid through said conduit, driving means for the liquid forcing means including a hydraulic clutch, an air separator interposed in said conduit on the inlet side of the liquid-forcing means, and means for withdrawing fluids from the upper part of the separator and positively forcing them into said clutch, the latter having outlet means large enough to pass all the gaseous fluid that the last-named means can force into said clutch and too small to pass all the liquid fluid that the last-named means can force into said clutch, whereby the clutch is rendered operative and the liquid forcing means is driven only when the separator is filled with liquid.

11. Liquid dispensing apparatus, comprising, a dispensing conduit adapted to be connected to a source of liquid supply, means for forcing liquid through said conduit, driving means for the liquid forcing means including a hydraulic clutch, an air separator interposed in said conduit on the inlet side of the liquid-forcing means, and located outside the separator, said clutch being means for withdrawing fluids from the upper part of the separator and positively forcing them into said clutch, the latter having outlet means large enough to pass all the gaseous fluid that the last-named means can force into said clutch and too small to pass all the liquid fluid that the last-named means can force into said clutch, whereby the clutch is rendered operative and the liquid forcing means is driven only when the separator is filled with liquid.

12. Liquid dispensing apparatus, comprising, a dispensing conduit adapted to be connected to a source of liquid supply, means for forcing liquid through said conduit, driving means for the liquid forcing means including a hydraulic clutch, an air separator interposed in said conduit on the inlet side of the liquid-forcing means, said clutch being located outside the separator and entirely surrounded at all times by air, and means for withdrawing fluids from the upper part of the separator and positively forcing them into said clutch, the latter having outlet means large enough to pass all the gaseous fluid that the last-named means can force into said clutch and too small to pass all the liquid fluid that the last-named means can force into said clutch, whereby the clutch is rendered operative and the liquid forcing means is driven only when the separator is filled with liquid.

13. Liquid dispensing apparatus, comprising, a dispensing conduit adapted to be connected to a source of liquid supply, means for forcing liquid through said conduit, driving means for the liquid-forcing means including a hydraulic clutch, said clutch comprising pump and turbine members composed of mating and confronting hollow ring members affording between them a first torus pipe and a second torus pipe within the first pipe and connected thereto by radial blades, separate peripheral vents for each torus pipe, an air separator on the inlet side of said liquid-forcing means, and means for withdrawing fluids from the upper part of said separator and forcing them into said pipes from a point inside the ring members and near the axis of rotation thereof, said vents being large enough to pass all the air that the last-named means can force into said pipes but too small to pass all the liquid that the last-named means can force into said pipes.

14. Liquid dispensing apparatus, comprising, a dispensing conduit adapted to be connected to a source of liquid supply, means for forcing liquid through said conduit, driving means for the liquid-forcing means including a hydraulic clutch, said clutch comprising pump and turbine members composed of mating and confronting hollow ring members affording between them a first torus pipe and a second torus pipe within the first pipe and connected thereto by radial blades and affording also a central inlet chamber from which liquid may be fed to said pipes by centrifugal force, separate peripheral vents for each torus pipe, an air separator on the inlet side of said liquid-forcing means, and means for withdrawing fluids from the upper part of said separator and forcing them into said inlet chamber, the latter having an outlet passage extending in the general direction of the axis of rotation of the clutch and effective after the torus pipes are filled with liquid to vent any air in the pumped liquid and effective to vent any excess liquid after the pipes and chamber are filled with liquid.

15. Liquid dispensing apparatus, comprising, a dispensing conduit adapted to be connected to a source of liquid supply, means for forcing liquid through said conduit, driving means for the liquid-forcing means including a hydraulic clutch, said clutch comprising pump and turbine members composed of mating and confronting hollow ring members affording between them a first torus pipe and a second torus pipe within the first pipe and connected thereto by radial blades, separate peripheral vents provided in the driving member of the clutch for each torus pipe, an air separator on the inlet side of said liquid-forcing means, and means for withdrawing fluids from the upper part of said separator and forcing them into said pipes from a point inside the ring members and near the axis of rotation thereof, the combined areas of said vents being large enough to pass all the air that the last-named means can force into said pipes and too small to pass all the liquid that said last-named means can force into said pipes.

16. Liquid dispensing apparatus, comprising, a dispensing conduit adapted to be connected to a source of liquid supply, means for forcing liquid through said conduit, driving means for the liquid-forcing means including a hydraulic clutch comprising a driving pump member and a driven turbine member, said members composed of mating and confronting hollow rings affording between them a first torus pipe and a second torus pipe within the first pipe and a central inlet chamber from which fluids may be discharged to said pipes, an air separator on the inlet side of said liquid-forcing means, a variable-capacity scavenging pump for withdrawing fluids from the upper part of the separator and forcing them into said inlet chamber, means for varying the capacity of said scavenging pump from a maximum when pumping air to a minimum when pumping liquid, said torus pipes having separate peripheral vents, the vents for said pipes being large enough to freely pass all the air that the scavenging pump can pump when working at maximum capacity and too small to pass all the liquid that the scavenging pump can pump when working at minimum capacity, and a vent from the inlet chamber located out of the path of centrifugal discharge therefrom for the purpose of discharging the liquid pumped by the scavenging pump in excess of that discharged by the vent in the first torus pipe.

17. In apparatus for the purpose described, a self-measuring liquid pump, an indicator directly connected to show measurements of all operations of said pump, an air separator having a vented chamber connected to the inlet side of said self-measuring pump, a dispensing line connected to the outlet side of said self-measuring pump, means including said air separator operable to either keep the self-measuring pump supplied on its inlet side with air-free liquid or to prevent the operation of the self-measuring pump, said means including a hydraulic clutch maintained at all times unimmersed in the liquid in said separator, the clutch having a motor-driven member and a hydraulic driven member, the latter having a driving connection for operating the self-measuring pump, a priming device adapted to prime the clutch for its operation with a branch from the same liquid supply as that to which the self-measuring pump is connected.

WARREN H. DE LANCEY.

CERTIFICATE OF CORRECTION.

Patent No. 2,358,629.                                September 19, 1944.

WARREN H. DE LANCEY.

It is hereby certified that error appears in the printed specification of the above numbered patent requiring correction as follows: Page 3, first column, line 32, for the word "from" read --form--; page 6, second column, lines 44 and 45, claim 11, for "and located outside the separator, said clutch being" read --said clutch being located outside the separator, and--; and that the said Letters Patent should be read with this correction therein that the same may conform to the record of the case in the Patent Office.

Signed and sealed this 21st day of November, A. D. 1944.

Leslie Frazer (Seal)                                        Acting Commissioner of Patents.